PROCESS FOR THE OXIDATION OF NITRIC OXIDE

Holger C. Andersen, Morristown, and Alfred J. Haley, Colonia, N.J., assignors, by mesne assignments, to Engelhard Industries, Inc., Newark, N.J., a corporation of Delaware
No Drawing. Filed June 12, 1959, Ser. No. 819,826
2 Claims. (Cl. 23—157)

This invention relates to a process for oxidizing nitric oxide and, more particularly, relates to the catalytic oxidation of nitric oxide to nitrogen dioxide.

In the production of nitric acid by the catalytic oxidation of ammonia, one of the reactions which limits the efficiency of the process is:

(1)  $NO + \tfrac{1}{2} O_2 = NO_2$

As is well known, nitric acid is formed by the reaction of the dioxide with water:

(2)  $3NO_2 + H_2O = 2HNO_3 + NO$ and the nitric oxide formed in this step must be reoxidized for reaction (1), in order to produce more nitric acid. Heretofore, this has been accomplished by using long contact times and large quantities of materials and/or a number of oxidation and water absorption steps.

The economic balance of the process is such that the waste gases from typical nitric acid plants contain about 0.3 percent nitric oxide, which is not only a nuisance, but also represents an economic loss of nitrogen. Thus, any means which would increase the nitrogen yield by increasing the rate of reaction (1) above, would have importance not only in ammonia oxidation plants, but more generally in any of the nitrogen fixation processes making direct use of air.

Of all the prior attempts to catalyze the reaction in question, results generally have been negative, with the exception of processes employing a few solid catalysts. Results with these solid catalysts are summarized in Table I below, and it will be noted that charcoal and silica gel are reported to have large effects on the conversion rate. There is disagreement, however, as to whether or not coconut charcoal and platinized asbestos are catalytic.

Even with charcoal and silica gel, water vapor exerts a strongly depressing effect on the rate. If the temperature is raised to produce a gas of lower relative humidity, the rate shows a decrease, as these catalysts generally have a negative activation energy. Accordingly, catalytic processes developed to date have not found commercial acceptance.

TABLE I

*Heterogeneous Catalysis of NO Oxidation to NO₂*

| Catalyst | Temp., °C. | Rate of NO oxidation relative to uncatalyzed rate |
|---|---|---|
| None | 0–50 | 1. |
| Crushed glass | 25–50 | 1. |
| Glass wool | | 1. |
| Pumice | 25 | 1.6. |
| Do | | 1. |
| Pumice plus tungstic acid | 50 | 1.5. |
| Pumice plus tungstic (H₂O₂) | 25 | 1.5. |
| Pumice plus NiO | 25 | 1.4. |
| Pumice plus CoO | 25 | 1.4. |
| Pumice plus Ni | 25 | 1.7. |
| Pumice plus Co | 25 | 1.7. |
| Pumice plus MuO₂ | 25 | 1.4. |
| Pumice plus Sb oxide | | 5. |
| Platinized pumice | 25 | 1.5. |
| Platinized asbestos | 25 | 1.5. |
| Coke | 25 | 1.8. |
| Common charcoal | 25 | 1.7. |
| Coconut charcoal | 25–80 | 700–900. |
| Do | 50–80 | 110–(220). |
| Peach kernel charcoal | 53–100 | 64–(200). |
| Steamed coke | 80 | (27). |

TABLE I—Continued

| Catalyst | Temp., °C. | Rate of NO oxidation relative to uncatalyzed rate |
|---|---|---|
| Hopcalite plus MnO₂ | | 5–10. |
| Carboalum gel | | 40. |
| Silica gel | | High. |
| Activated carbon | | Increased. |
| Do | | Do. |
| Paraffin | | Decreased. |
| Do | | Do. |
| Alumina gel | 30–80 | Increased. |

In copending application Serial Number 615,496, filed October 12, 1956, there is disclosed a single stage catalytic process for the purification of waste or tail gases wherein oxides of nitrogen are eliminated while heating values of the waste gases are simultaneously recovered. In this process, the oxygen present in the waste gases is removed by a catalytic combustion reaction, and the oxides of nitrogen are reduced to nitrogen and water. In catalytic processes of this type, it has been found that it is generally necessary to have a fuel present in a stoichiometric excess over the oxygen content of the waste gas and, under such conditions, a very large quantity of heat is generated in the catalyst bed.

The high temperature attained by the catalyst is detrimental in that a loss of catalyst activity results, and the problem becomes of greater magnitude with increasing oxygen concentration in the waste or tail gases.

In copending application Serial Number 650,860, filed April 5, 1957, now Patent No. 2,970,034, one method of overcoming the foregoing deficiency is disclosed in which the removal of oxygen and the catalytic reduction of the oxides of nitrogen in waste or tail gases is effected in two stages in such a manner that only a part of the total heat is generated in each stage. The temperature to which the catalyst is subjected is thus decreased and its life and activity are correspondingly extended.

In copending application Serial Number 694,502, filed November 5, 1957, now Patent No. 2,975,025, a process is disclosed for the selective removal of oxides of nitrogen from waste or tail gases without appreciable consumption of the oxygen present in the gases and, in this process, ammonia is used as the fuel. In this process, the gaseous mixture is passed over a supported platinum group metal-containing catalyst, whereby selective removal of the oxides of nitrogen from oxygen-containing gas is effected.

In copending application Serial Number 803,065, filed March 31, 1959, now abandoned, there is disclosed a process in which hydrogen or other easily ignitible fuel is added to a gas stream which contains at least nitric oxide and nitrogen dioxide and which also may contain oxygen and inert gases, and passing the mixture over a suitable catalyst, i.e. a platinum group metal-containing catalyst, preferably platinum, ruthenium, palladium or rhodium. In this process, the nitrogen dioxide is selectively reduced to nitric oxide.

In copending application Serial Number 807,004, filed April 17, 1959, now Patent No. 3,032,387, an improvement in the ammonia selective process is disclosed, in which hydrogen is mixed with ammonia and passed through a single bed of catalyst, or the hydrogen may be added to the main gas stream which is passed through a first catalyst bed, after which the semi-treated gas is mixed with ammonia and treated catalytically in a second catalyst bed. In addition, the single catalyst bed may be comprised of a number of layers of different catalytic materials, such that the gas to be treated contacts a first catalyst and a second catalyst in the same bed, or the separate catalyst beds may be comprised of the same or different catalysts.

In accordance with the present invention, a process is provided for oxidizing nitric oxides to nitrogen dioxide in which a nitric oxide-containing gas is contacted with a platinum, palladium, rhodium or ruthenium catalyst, supported on an oxide-containing carrier, at a temperature in the range of about 200 to 450° C., preferably 250 to 400° C. Mixtures of the aforementioned catalytic metals may be also employed.

Among the oxide-containing catalyst supports which may be employed are activated alumina, silica gel, diatomaceous earth, pumice, asbestos, titanium dioxide, clay, calcium carbonate, and the like. The catalyst metal may be in the range of about 0.1 percent to about 2 percent, by weight of the catalyst metal and support, and the support may be in the form of pellets, granules or powder. The supported catalyst may be prepared in any suitable manner, i.e. by treating the carrier or support with a solution of a suitable metal compound, and then reducing the metal compound to metal.

The space velocity employed in the process of the present invention may be in the range of about 1 to 100,000, preferably 5,000 to 10,000, standard cubic feet of gas per cubic foot of catalyst per hour, and the reaction pressure may be in the range of about 1 atmosphere to 100 p.s.i.g. or higher.

The gas stream amenable to treatment by the process of the invention may contain nitric oxide, oxygen, water vapor, nitrogen and other inert gases. The nitric oxide content may be in the range of a few parts per million up to 2 percent or more, by volume. The oxygen may be present in a quantity ranging from the nitric oxide equivalent to the entire balance of the gas. The water vapor may be present in amounts up to 5 percent or more, by volume, and the nitrogen and other inert gases may be in any concentration to make up the balance.

This invention also includes a novel analytic method for the determination of nitric oxide in gaseous mixtures. The gas, containing nitric oxide and an excess of oxygen, is passed over the catalyst, which promotes formation of nitrogen dioxide. The latter is readily determined either chemically or physically.

Heretofore, this oxidation to the analytical detectable species has required the use of ozone or other oxidants, which is attended by several serious difficulties. With use of either an ozonator or a $KMnO_4$ solution, it has not been possible to convert NO quantitatively to $NO_2$ without formation of some $N_2O_5$ or $N_2O_3$, or leaving unchanged NO. Other difficulties of these processes are considerable expense in operation of an ozonator, and removal of $NO_2$ from solution for analysis, when it is formed in the presence of $KMnO_4$.

The invention will be further illustrated by reference to the following specific examples, in which all gaseous percentages are by volume:

EXAMPLE I

A number of materials were investigated for catalytic efficacy in the oxidation of nitric oxide to nitrogen dioxide. In these tests, metered quantities of oxygen and a nitric oxide-nitrogen mixture were passed through various catalyst beds, the effluent from the catalyst beds then being passed into a photometer which indicated the degree of conversion. The flow rate used in the experiments (100 liters per hour) was such that negligible non-catalytic oxidation to nitrogen dioxide occurred in the apparatus.

The conditions employed in the tests and the results obtained are as follows:

TABLE II

*Oxidation of NO to $NO_2$*

Conditions:
  0 p.s.i.g. and 10,000 hr.$^{-1}$ S.V. using 10 ml. of material.
  A—Material tested through range of 25 to 150° C.
  B—Material tested through range of 25 to 400° C.
Inlet gas: 0.3 percent NO and 3 percent $O_2$ in $N_2$.

| Expt. No. | | Test | Conversion max., Percent |
|---|---|---|---|
| 1 | Carbon, Columbia SXC | A | 100 at 30–50° C. <1 hr. |
| 2 | 2% Pt/Carbon | A | 36 at 27–32° C. |
| 3 | 0.1% Pd/carbon | A | 40 at 26–28° C. |
| 4 | Carbon-Columbia S.J. | A | 23 at 22–30° C. |
| 5 | 0.5% Pt/periclase | B | 21 at 255° C. |
| 6 | 0.5% Pt/$Al_2O_3$ | B | 100 at 315° C. |
| 7 | Plain $Al_2O_3$ | B | 30 at 460° C. |
| 8 | 2% Pt/$Al_2O_3$ | B | 100 at 315° C. |
| 9 | 2% Pt/$ZrSiO_4$ | B | 50 at 350° C. |
| 10 | 5% Pt/carbon | B | 60 at 37° C. |
| 11 | 0.5% Rh/$Al_2O_3$ | B | 50 at 420° C. |
| 12 | 0.5% Pd/$Al_2O_3$ | B | 50 at 428° C. |
| 13 | 0.5% Ru/$Al_2O_3$ | B | 100 at 323° C. |

From the foregoing table it will be noted that supported platinum, palladium, rhodium and ruthenium were very effective. Catalysts supported on carbon were efficacious at lower temperatures, but were sensitive to the presence of water vapor and, if the temperature of the catalyst is raised appreciably over the dew point, the efficiency of the carbon-based catalyst declines, whereas catalysts supported on oxide-containing carriers show improved efficiency at higher temperatures.

The data given in the table below show the relative inefficiency of a 5 percent platinum on granular carbon catalyst at temperatures above 50° C., and the same negative trend with increasing temperature may be expected in the use of the carbon catalyst per se of the prior art. The data are as follows:

TABLE III

5% Pt/C (*granular*)

Inlet gas:
  NO—0.28 Mol percent
  $O_2$—3
  $N_2$—Balance

Conditions:
  0 p.s.i.g. and 10,000 hr.$^{-1}$
  S.V. using 10 ml. cat.

| Temp., °C. | Conv. to $NO_2$ | |
|---|---|---|
| | Effluent, mole percent $NO_2$ | Percent of NO to $NO_2$ in effluent |
| 35 | 0.18 | 65 |
| 40 | 0.08 | 29 |
| 45 | 0.06 | 21 |
| 50 | 0.04 | 7 |
| 55 | 0.025 | 0.9 |

EXAMPLE II

Since it is particularly important that the catalyst operate in streams containing water vapor, further tests of a platinum catalyst were made in a stream containing 3 percent water vapor, following the general procedure employed in Example I above.

The conditions employed and the results obtained are given in the table below:

TABLE IV

*Conversion of NO to $NO_2$*

Gas Stream:
0.3 percent NO, 1 atm. pressure
3 percent $O_2$
Bal. $N_2$ and $H_2O$

| Catalyst and conditions | Percent conversion to $NO_2$ | |
| --- | --- | --- |
| | $H_2O=0$ | $H_2O \sim 3$ percent |
| (1) 0.5 percent $Pt/Al_2O_3$ pellets, 10,000 SLPH/L (NTP), 320° C | 100 | ¹ 100 |
| (2) 0.5 percent $Ru/Al_2O_3$ pellets, 10,000 SLPH/L, 315° C | 100 | ¹ 100 |
| (3) Platinized aluminum wool: | | |
| a. 0.0001 percent Pt., 280,000 SLPH/g., 390° C | 32 | 32 |
| b. Heavily platinized wool: | | |
| 60,000 SLPH/g., 390–400° C | 50 | |
| 280,000 SLPH/g., 400° C | 39 | |

¹ After 24 hrs. on stream.

From the foregoing table it will be noted that quantitative conversion of nitric oxide to nitrogen dioxide was obtained both in the presence and absence of water vapor.

EXAMPLE III

A synthetic blend of 0.3 percent nitric oxide in nitrogen was prepared by adding a measured amount of nitric oxide to a cylinder under vacuum, and then compressing in nitrogen, for a suitable total pressure. This blend was metered at the rate of 100 standard liters per hour, and at a pressure of 10 p.s.i.g. through a differential type flowmeter, and then mixed with oxygen to make up 3 percent oxygen and 0.3 percent nitric oxide in nitrogen immediately before entering a glass reactor having a 14 mm. internal diameter. The reactor was enclosed in an electrically heated furnace and the catalyst bed temperature was measured with a mercury thermometer.

The reactor effluent was passed to a photometer consisting of a glass tube 48" x ¾", internal diameter, wound with an electric heating element and covered with asbestos. The tube had a side arm 1½" from each end, the ends being sealed with optically flat glass. A beam of light was passed through the tube and received by a Weston layer type photoelectric cell positioned at the other end. The electrical output of the photocell was supplied to a 0–10 mv. continuous recorder and a 0–100 micro-ammeter. Passage of red-brown colored nitric dioxide through the tube absorbed light, resulting in a lower electrical output by the photocell proportionate to the concentration of nitrogen dioxide in the tube. The photometer was enclosed in a 10" x 10" x 52" box to prevent erroneous reading of the photocell as a result of stray external lighting. The photometer effluent was vented to a hood.

The photometer was calibrated for 0.3 percent nitrogen dioxide in nitrogen by the following method:

The photometer tube was heated to about 100° C., to prevent condensation of water vapor and consequent erratic results. Dry nitrogen was passed through the photometer and the micro-ammeter reading was adjusted to 100 by adjusting a variable resistor in the photocell circuit. Saturating the nitrogen stream with water at 25° C. had no effect on the meter reading.

A dry mixture of preanalyzed 0.28 percent nitrogen dioxide and 3 percent oxygen in nitrogen was passed through the tube with a corresponding reading of 63 on the micro-ammeter. Intermediate concentrations of nitrogen dioxide showed results consistent with Beer's law.

EXAMPLE IV

A 10 ml. sample of 0.5 percent platinum on ⅛" activated alumina pellets was charged to the reactor employed in Example III above, and a stream of 0.28 percent nitric oxide and 3 percent oxygen in nitrogen was passed over the catalyst at a flow rate of 100 standard liters per hour, following the same general procedure of Example III above. Increasing the catalyst temperature to 320° C. caused the micro-ammeter reading to decrease to 63, equivalent to 0.28 percent nitrogen dioxide and 100 percent conversion of the nitric oxide.

The above stream was saturated by passing the 0.28 percent nitric oxide in nitrogen portion through a fritted glass dispersion bottle containing 100 ml. of water, at a temperature of 25° C., before the gas was mixed with oxygen and, as a result of this treatment, the final stream contained about 3 percent water vapor. The reactor was charged with 20 ml. of 0.5 percent platinum on ⅛" activated alumina pellets, and the gas stream was passed over the catalyst at a flow rate of 100 standard liters per hour. At a temperature of 310° C., the micro-ammeter reading was 63, indicating 100 percent conversion to nitrogen dioxide. Decreasing the catalyst volume to 10 ml., and operating at the same conditions, resulted in a meter reading of 71, equivalent to 75 percent conversion of nitric oxide to nitrogen dioxide. Increasing the catalyst volume to 50 ml., and operating at the same conditions, resulted in a meter reading of 63, equivalent to 100 percent conversion to nitrogen dioxide.

The data in the table below show the temperature dependence of the oxidation reaction of nitric oxide to nitrogen dioxide using a catalyst consisting of 0.5 percent platinum on ⅛-inch activated alumina pellets. The data are especially interesting in that they show a decrease of the $NO_2$ out/NO in ratio at higher temperatures when a catalyst is present. It will be noted that in the empty reactor the ratio increased from 0.053 to 0.075 as the temperature increased from 390° to 436° C. In all cases where a catalyst is present, the ratio decreases at temperatures above 350° C. At higher temperatures, the reaction $NO+O_2=NO_2$ is reversed, and it appears that the observed reversal of the reaction occurs at lower temperatures when a catalyst is present. The data are as follows:

TABLE V

*Conversion of NO to $NO_2$*

Inlet gas: 0.28% NO, 3% $O_2$, 3% $H_2O$ in $N_2$
Catalyst: 0.5% Pt/⅛" activated alumina pellets
Conditions: 0 p.s.i.g. and 100 s.l.p.h total gas flow

| S.V., Vol./Vol.-hr. | Temp., °C. | $NO_2$ out/ NO in |
| --- | --- | --- |
| Empty reactor | 250 | 0.035 |
|  | 280 | 0.053 |
|  | 314 | 0.053 |
|  | 350 | 0.053 |
|  | 390 | 0.053 |
|  | 436 | 0.075 |
| 100,000 hr.⁻¹ | 250 | 0.075 |
|  | 270 | 0.107 |
|  | 304 | 0.14 |
|  | 314 | 0.18 |
|  | 338 | 0.215 |
|  | 358 | 0.25 |
|  | 400 | 0.215 |
| 50,000 hr.⁻¹ | 248 | 0.215 |
|  | 282 | 0.29 |
|  | 312 | 0.35 |
|  | 352 | 0.375 |
|  | 383 | 0.35 |
|  | 428 | 0.27 |
| 20,000 hr.⁻¹ | 269 | 0.49 |
|  | 280 | 0.57 |
|  | 326 | 0.61 |
|  | 350 | 0.57 |
|  | 388 | 0.43 |
|  | 410 | 0.35 |
|  | 445 | 0.27 |
| 5,000 hr.⁻¹ | 230 | 0.53 |
|  | 242 | 0.66 |
|  | 262 | 0.89 |
|  | 282 | 1.0 |
|  | 300 | 1.0 |
|  | 375 | 0.79 |

EXAMPLE V

Elevated pressure tests to determine the nitrogen dioxide absorbability of water and aqueous solutions were conducted according to the following procedure: A high pressure cylinder of nitrogen dioxide, having a conventional pressure reducing valve attached thereto, was connected to a conventional Hoke scrubber The Hoke scrubber consisted of a stainless steel cylinder about 7 inches long, having an internal diameter of 1.5 inches and a capacity of about 300 ml. About 100 ml. of water, or other solution to be tested, was contained therein. The inlet was a stainless steel pipe reaching below the water level, almost to the bottom, and containing a fritted disc to break up the gas bubbles as they passed through the water or other solution. The exhaust nitrogen dioxide was measured in a conventional manner with a standard photometer. The results are as follows:

| Absorbent | Gas | Flow | Pressure, p.s.i.g. | $NO_2$ in percent | $NO_2$ out [1] by volume | Rel. percent absorbed |
|---|---|---|---|---|---|---|
| 100 ml. dist. $H_2O$ | 100 | LPH | 0 | 0.51 | 0.135 | 73 |
| Do | 100 | | 25 | 0.51 | 0.05 | 90 |
| Do | 100 | | 50 | 0.51 | 0.02 | 96 |
| 10% $HNO_3$ | 100 | | 50 | 0.51 | 0.02 | 96 |

[1] As compared to dry stream calibration.

It appears that increasing pressure significantly increases the efficiency of the scrubbing. Higher pressures were not investigated due to equipment limitations.

It will be obvious to those skilled in the art that many modifications may be made within the scope of the present invention without departing from the spirit thereof, and the invention includes all such modifications.

What is claimed is:

1. A process for oxidizing nitric oxide to nitrogen dioxide, which comprises contacting a nitric oxide- and oxygen-containing gas also containing water vapor with a supported catalyst comprising a catalytic metal selected from the group consisting of platinum, palladium, rhodium and ruthenium supported on an oxide-containing carrier selected from the group consisting of activated alumina, pumice, silica gel, diatomaceous earth, asbestos, titanium dioxide, clay and calcium carbonate, the catalytic metal being present in amount within the range of about 0.1 to about 2 percent by weight of the catalyst metal and carrier, at a temperature in the range of about 200° C.–450° C. and a space velocity in the range of about 5,000 to 100,000 standard cubic feet of gas per cubic foot of catalyst per hour.

2. A process according to claim 1 in which the carrier is activated alumina.

References Cited in the file of this patent

UNITED STATES PATENTS

| | | |
|---|---|---|
| 1,347,158 | Henwood | July 20, 1920 |
| 1,433,969 | Noyes | Oct. 31, 1922 |
| 1,520,437 | Pipkin | Dec. 23, 1924 |
| 2,079,404 | Harris | May 24, 1937 |
| 2,115,173 | Klingelhoefer | Apr. 26, 1938 |
| 2,330,664 | Bennett et al. | Sept. 28, 1943 |